United States Patent [19]

Tuhy, Jr.

[11] Patent Number: 4,665,547

[45] Date of Patent: May 12, 1987

[54] LIMITING AMPLIFIER FOR COMMON MODE FEEDBACK IN TELEPHONE LINE FEED CIRCUITS

[75] Inventor: Frank P. Tuhy, Jr., Montville, N.J.

[73] Assignees: AT&T Company; AT&T Bell Laboratories, both of Murray Hill, N.J.

[21] Appl. No.: 667,851

[22] Filed: Nov. 2, 1984

[51] Int. Cl.$^4$ .................................. H04M 19/08
[52] U.S. Cl. ............................ 379/402; 379/395; 307/494; 307/567
[58] Field of Search ......... 179/16 AA, 170 NC, 81 B, 179/81 R, 170 R; 307/540, 558, 567, 565, 494, 359; 330/258, 298, 207 P

[56] References Cited

U.S. PATENT DOCUMENTS

| | | | |
|---|---|---|---|
| 3,392,287 | 7/1968 | McFadyen et al. | 307/565 X |
| 3,500,218 | 3/1970 | Burwen | 330/298 |
| 3,624,533 | 11/1971 | Schiff | 330/253 |
| 3,922,570 | 11/1975 | Eguchi et al. | 307/565 X |
| 4,007,335 | 2/1977 | Hetherington et al. | 179/16 AA |
| 4,051,443 | 9/1977 | Seki et al. | 330/258 |
| 4,169,215 | 9/1979 | James et al. | 179/16 F |
| 4,268,760 | 5/1981 | Tokunaga et al. | 307/562 |
| 4,476,350 | 10/1984 | Aull et al. | 179/70 |
| 4,479,094 | 10/1984 | Harris | 330/261 |
| 4,492,824 | 1/1985 | Bell et al. | 179/81 B |
| 4,540,853 | 9/1985 | Albouy | 179/18 FA |
| 4,577,064 | 3/1986 | Huft et al. | 179/16 F |

OTHER PUBLICATIONS

Analysis and Design of Analog Integrated Circuits, P. Gray et al., John Wiley & Sons, 1977, pp. 108-109.
Signetics Digital Linear MOS, Signetics Corporation, 1972, p. 164.
Linear Applications, vol. 1, Robert C. Dobkin, Radio Shack cat. No. 62-1373, 1969, p. LB8-1.
"A High-Voltage IC for a Transformerless Trunk and Subscriber Line Interface", by D. W. Aull, et al., 1981 *IEEE Journal of Solid-State Circuits*, vol. SC-16, No. 4, Aug. 1981, pp. 261-265.

*Primary Examiner*—Gene Z. Rubinson
*Assistant Examiner*—R. Vaas
*Attorney, Agent, or Firm*—Charles Scott Phelan

[57] ABSTRACT

A signal limiting amplifier includes interstage limiting devices to restrict the range of output voltage signals. The devices are base-emitter circuits of transistors, one of which operates in response to one polarity of signals and has its collector terminal unconnected, and the other of which operates in response to the other polarity of signals and has its collector circuit connected (when limiting) to operate an appropriate utilization circuit. In one embodiment, the limiting amplifier is applied as a common mode feedback amplifier in a telephone line feed circuit, and the limiter signal is used to limit large longitudinal signals on a customer line and to power down the line feed circuit in the event the limited signals persist beyond a certain interval.

6 Claims, 2 Drawing Figures

LIMITING AMPLIFIER FOR COMMON MODE FEEDBACK IN TELEPHONE LINE FEED CIRCUITS

FIELD OF THE INVENTION

This invention relates to limiting amplifiers, and it relates more particularly to such amplifiers which are useful for common mode feedback in telephone line feed circuits.

BACKGROUND OF THE INVENTION

Various signal limiting techniques are known in the art, but some unique problems arise when limiting signals in a telephone system electronic line feed circuit of a telephone line interface unit. For example, the appearance of an extraneous voltage of large size compared to those normally occurring on a customer line can cause a line feed amplifier to be driven so hard to source or sink the current that physical integrity of the amplifier is in jeopardy.

The use of a common mode feedback arrangement to suppress longitudinal signals, which are often quite large, is taught by, for example, D. W. Aull et al. in "A High-Voltage IC for a Transformerless Trunk and Subscriber Line Interface," 1981 *IEEE JOURNAL OF SOLID-STATE CIRCUITS*, Vol. SC-16, No. 4, Aug. 1981, pages 261–265. A common mode amplifier includes an output current limiting circuit. Separate thermal-shutdown circuits are provided.

A battery feed circuit with a differential operational amplifier connected to reduce common mode signals is shown in the I. K. Hetherington et al. U.S. Pat. No. 4,007,335.

Limiting arrangements of various types can be employed in the voice signal path, but limitations on their operation should be recognized. For example, Aull et al. use surge protection diode clamps; but those clamps come into play only when a large voltage is present. However, it is possible in circuits of this type for either the tip amplifier or the ring amplifier to operate within its permissible voltage range and still be called upon by its common mode feedback to produce a current that is large enough to burn out the amplifier. Likewise, the surge protection is at amplifier output points where the voltage level is comparatively high and similarly more difficult to deal with precisely. Thus, the activating threshold for the surge protection is often set somewhat lower than might otherwise be the case in order to allow a suitable safety margin. However, if the threshold is too close to the top of the voltage range required for quality signal reproduction, a large voice signal excursion may be clipped.

Aull et al. also provide a power-down/thermal shutdown arrangement that is responsive to a certain base-emitter voltage threshold in a temperature sensitive transistor to power down at least the tip and common mode amplifiers. However, in the short time required for this function to operate, a tip or ring amplifier could produce a sufficiently high current to burn itself out. The safety margin requirements to assure protection in the face of this time factor, and to take account of a certain amount of indefiniteness in the exact threshold current level which will produce power down, also consume a part of the amplifier operating range that would otherwise be available for desired signal amplification.

An R. S. Burwen U.S. Pat. No. 3,500,218 employs a network of resistors, diodes, and transistors to sense voltage at an amplifier output stage emitter to control a signal path limiting function.

Limiting diodes are connected across the input to an amplifier in a P. Schiff U.S. Pat. No. 3,624,533 to protect amplifier input transistors.

It is also known to perform limiting at least partly out of the voice signal path. Thus, the D. B. James U.S. Pat. No. 4,169,215 shows separation of an excessive signal component into a separate circuit where it is attenuated and inverted before being injected back into the path to cancel at least in part of the excessive signal.

SUMMARY OF THE INVENTION

Limiting is performed in an amplifier through signal path at an interstage coupling location in a relatively low voltage environment. In one embodiment, the limiting is effected by the base-emitter junction of at least one transistor. One application of the amplifier is in the common mode feedback path of a line feed circuit where limiting thresholds can be set without significant concern for possible voice signal distortion.

BRIEF DESCRIPTION OF THE DRAWINGS

A more complete understanding of the invention and the various features, objects, and advantages thereof can be obtained from a consideration of the following Detailed Description in connection with the appended claims and the attached drawings in which:

DETAILED DESCRIPTION

Figure 1:
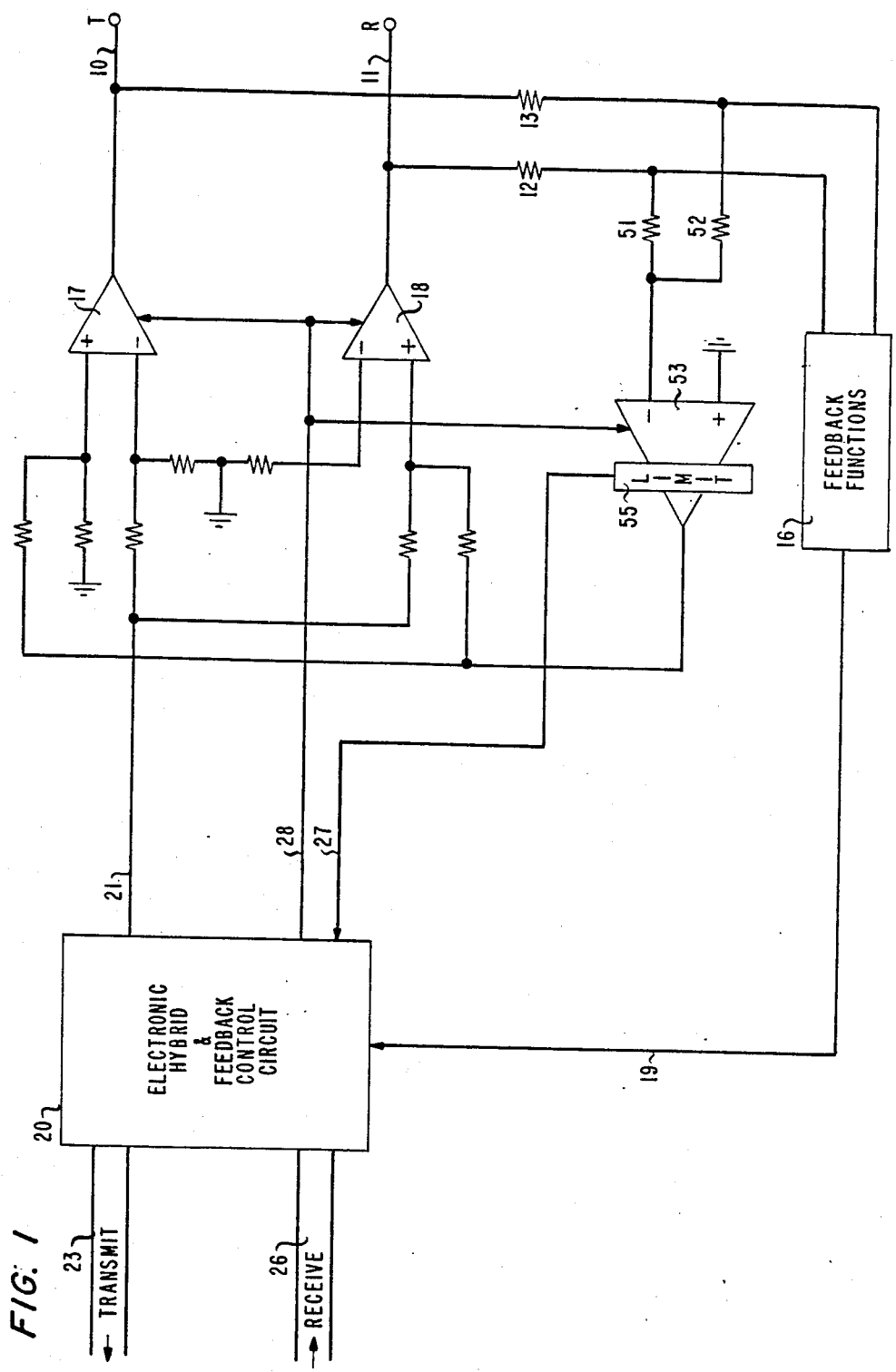
FIG. 1 is a simplified functional diagram of a telephone system electronic line feed circuit utilizing the present invention.

The FIG. 1 line interface unit is so named because it provides the electronic interface between tip and ring conductors of a two-wire telephone customer line and 4-wire transmission path. Such a unit is typically part of a plug-in circuit board which is inserted into an equipment frame to which the customer circuit is brought. The circuit of FIG. 1 is a greatly simplified form of the line feed circuit of the copending R. Toumani U.S. patent application Ser. No. 635,209, filed July 27, 1984, entitled "Electronic Battery Feed Circuit For Telephone Systems," and assigned to the same assignee as the present application. The description of that battery feed circuit is hereby incorporated herein by reference, and modifications thereto reflecting the improved common mode feedback amplifier of the present invention are described herein, modified to illustrate the present invention.

Tip and ring connections 10 and 11 are provided for the customer line. Line signal variations are coupled through a pair of equal voltage dropping resistors 12 and 13 to a function circuit 16 wherein the usual alternating current and direct current feedback functions are performed. An output of circuit 16 is applied on a circuit path 19 to an electronic hybrid and feedback control circuit 20. That circuit provides on a lead 21 inputs to inverting and noninverting connections of tip and ring transconductance amplifiers 17 and 18, respectively, as well as providing subscriber loop signals from connections 10 and 11, via circuit 16, to a two-wire transmit circuit 23 and taking input from a two-wire receive circuit 26 for amplifiers 17 and 18. Feedback and other resistors (not shown), apart from the illustrated input coupling resistors, associated with amplifiers 17, 18, and 53 are, for purposes of FIG. 1, considered to be included within the respective amplifier schematic representations.

Outputs of amplifiers 17 and 18 are connected to tip and ring circuits 10 and 11, respectively, by way of protection circuits (not shown in FIG. 1). A pair of equal-resistance resistors 51 and 52 are connected in series between the low voltage ends of resistors 12 and 13 and have their series midpoint connected to the inverting input connection of a common mode amplifier 53. Each of the resistors 51 and 52 has a resistance which is advantageously very small compared to the resistance of one of the resistors 12 and 13. Resistors 51 and 52 provide to amplifier 53 a signal which is a function of the sum of the tip and ring connection signals. The overall effect of the resistors 12, 13, 51, and 52 is to couple common mode signals to amplifier 53 and suppress metallic signals at the input to that amplifier. Output signals from amplifier 53 are applied to noninverting input connections of the tip and ring amplifiers 17 and 18.

Common mode amplifier 53 includes an interstage limiting circuit 55, to be described, which both affects the output of amplifier 53 and also provides a utilization output. In this embodiment, that output is coupled to the hybrid and control circuit 20 by a lead 27 to initiate power down of the battery feed circuit by a bias control signal on a lead 28 in response to initiation of certain limiting operations of duration longer than a predetermined interval. Thus, a form of dual protection is available in that while that interval is running the output voltage of amplifier 53, and hence the input voltages and common mode output currents of amplifiers 17 and 18, are limited. The location of the limiting at an interstage point in the common mode feedback amplifier permits the limiting function to be carried out at a comparatively low voltage compared to, e.g., voltages at tip and ring amplifier outputs. In the embodiment to be described, the level is low enough that it is advantageously set by use of semiconductor junction devices.

Figure 2:
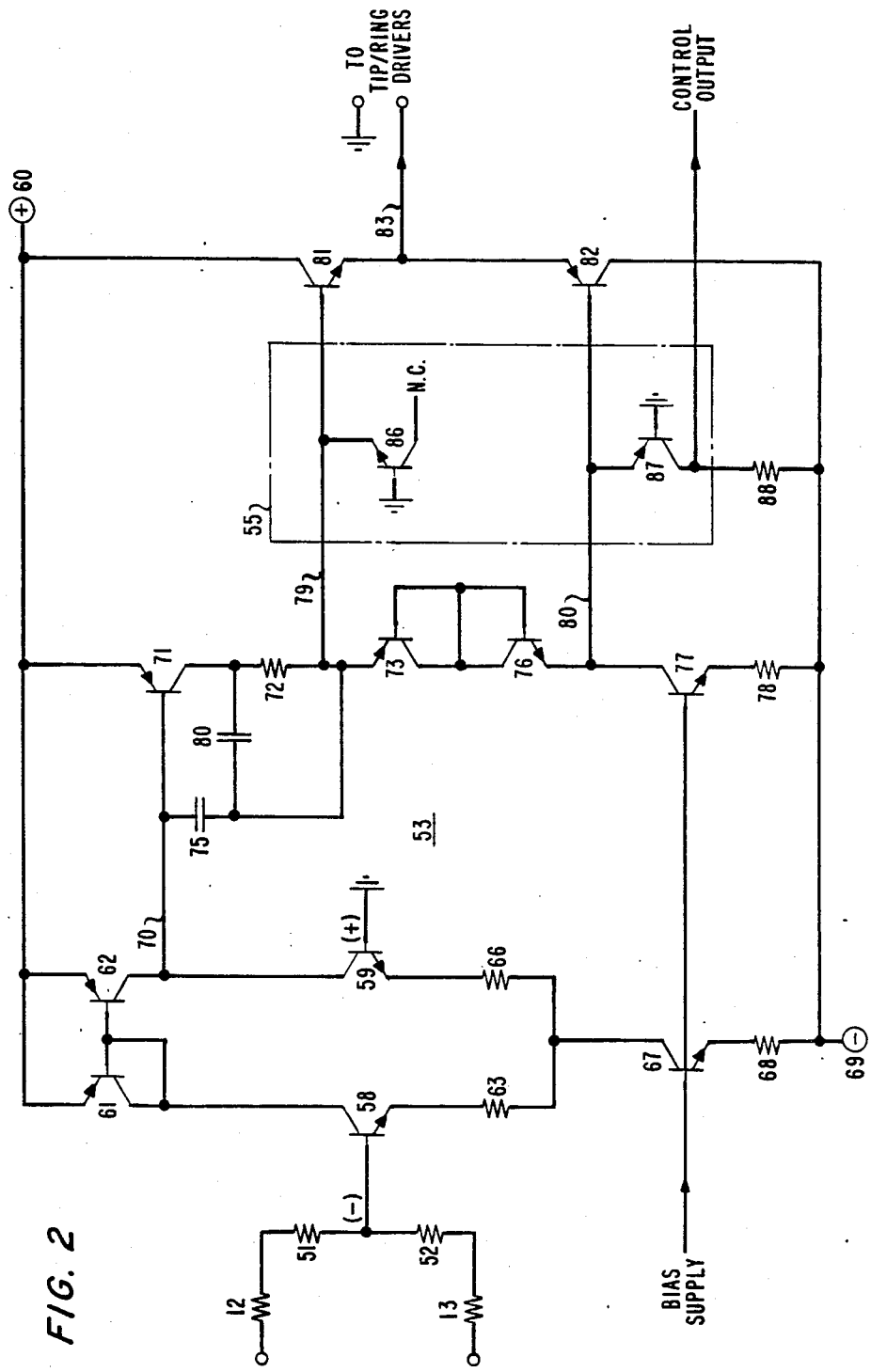
FIG. 2 is a schematic diagram of a limiting amplifier which is useful in the circuit of FIG. 1.

FIG. 2 illustrates schematic detail of the common mode amplifier 53 and its limiting function 55. Voltage supplies are schematically represented by a circled polarity sign to represent a suitable source, such as a battery, having a terminal of opposite polarity connected to ground.

The terminal between resistors 51 and 52 is connected to the inverting input of the amplifier 53 at a base terminal of an npn transistor 58 which connected in a difference amplifier circuit with another npn transistor 59 that has its base terminal connected to ground. Collector current of those two transistors is supplied from a positive supply 60 by way of master and slave pnp transistors 61 and 62 of a current mirror circuit. Equal resistors 63 and 66 connect emitter terminals of transistors 58 and 59 through a current source npn transistor 67 and a resistor 68 to a negative supply 69. A common mode reference supply, i.e. the bias control signal on lead 28 in FIG. 1, sets the conduction level of transistor 67 at a level which sets the proper bias conditions of the amplifier. Accordingly, average signal variations at the base terminal of transistor 58 cause corresponding variations in the amount of current mirrored into the collector circuit of transistor 59. A lead 70 couples signal variations from that collector circuit to an input of a control stage at a base terminal of a pnp transistor 71.

Transistor 71 has its internal collector-emitter path connected in series with a resistor 72, a diode-connected pnp transistor 73, a diode-connected npn transistor 76, an npn transistor 77, and a resistor 78 between supplies 60 and 69. Resistor 72 performs a current limiting function, during amplifier limiting operations to be described, to protect transistor 71. Capacitors 75 and 80 are high frequency bypass capacitors provided for high frequency closed loop stability of the common mode amplifier 53. Transistors 73 and 76 match transistors 82 and 81. The current source bias from transistor 77 establishes a voltage drop across transistors 73 and 76 and results in the same current flow through matching transistors 81 and 82, the output stage of the amplifier. Transistor 77 has its base terminal connected to the same reference bias as transistor 67 and is also operated as a current source, in cooperation with resistor 78 to fix control stage current to supply 69 at a level depending on the relative resistances of resistors 68 and 78. In the illustrative embodiment, the current of transistor 67 is advantageously twice that of transistor 77.

Emitter terminals of transistors 73 and 76 are coupled by way of interstage coupling leads 79 and 80 to base terminals of an npn transistor 81 and a pnp transistor 82, respectively, in the amplifier output stage. It can then be seen that signal variations in transistor 71 either drive current into the base of transistor 81 or cause transistor 77 to draw current from the base of transistor 82 with the consequent positive-going or negative-going variations in voltage on leads 79 and 80. Collector-emitter paths of transistors 81 and 82 are connected in series between supplies 60 and 69 and act as source and sink transistors, respectively, to a ground referenced output lead 83 which is connected, as previously described, to inputs of tip and ring amplifiers 17 and 18.

To provide fast limiting of amplifier 53 output, semiconductor junctions, such as the base-emitter junctions of an npn transistor 86 and a pnp transistor 87 are connected between ground and leads 79 and 80, respectively. Transistor 86 has no collector terminal connection in the illustrative embodiment, but it can of course be connected to any suitable utilization circuit which is to be operated in response to onset of limiting action in the transistor. If the drive to the base of transistor 71 is small, there is insufficient conduction to supply transistor 77 and its remaining needs are provided from lead 83 and transistor 82 emitter-base junction. If operation in this fashion produces such a small current flow in transistor 71 as to tend to draw lead 79 more than one base-emitter junction voltage drop below ground transistor 86 is biased into conduction to limit further negative-going excursion and similarly limit voltage at lead 83. Transistor 87 is similarly connected and functions to limit during positive-going swings in the current of transistor 71. That is, to the extent that transistor 71 is driven hard enough to supply to current-source-connected transistor 77 more current than it can handle, the excess current is supplied through transistor 81 to output lead 83. If that action pulls the collector of transistor 77, and hence the lead 80, more than one base-emitter junction voltage drop above ground, transistor 87 becomes conducting to limit further excursion of that lead and sink any additional current supplied. Conduction in the collector of transistor 87 activates power control logic to power down circuits of the interface unit.

In normal nonlimiting operation, i.e., with no faults on the customer line, none of transistors 71, 73, 76, or 77 saturates. The transistor 77 emitter terminal is always at a fixed potential above the voltage of supply 69. Average signal variations at the input to amplifier 53 increase or decrease current in transistor 71 and either drive transistor 81 to source current to lead 83 (with decreasing current in transistor 82) or drive transistor 82 to sink current from lead 83 (with decreasing current in transistor 81). In that type of operation, lead 79 swings between one base-emitter junction voltage drop below ground, when transistor 86 is conducting in negative limiting, and a positive value set by the voltage drops across transistors 73 and 76 (two base-emitter voltages) and the base-emitter voltage of transistor 87 (when transistor 87 is limiting). In the latter condition, transistor 71 is permitted to go into saturated operation since time for recovery is available in the illustrated common mode amplifier application of the invention. Similarly, lead 80 swings between one base-emitter junction voltage drop above ground, when transistor 87 is positive limiting, and a negative value set by the voltage drops across transistors 76 and 73 (two base-emitter voltages) and the base emitter voltage of transistor 86 (when transistor 86 is limiting).

The result of the foregoing is that limiting thresholds are precisely defined by semiconductor junctions operating in a small voltage range. As far as lead 83 is concerned, it is confined to a range of about plus or minus 1.5 volts, i.e., a net of two base-emitter junction voltage drops (those of transistors 86, 73, and 76 less that of transistor 82) below ground at one extreme and a net of two base-emitter junction voltage drops (those of transistors 73, 76, and 87 less that of transistor 81) above ground at the other extreme. Of course that range can be increased by adding semiconductor junctions in series with each of the transistors 86 and 87.

In the illustrated common mode amplifier application, the collector signal of only one of the limiter transistors 86 and 87 need be employed for actuating the power down function. This is because it can be shown that, as between positive-going and negative-going voltage fault occurrences on the subscriber line, only one of them poses a threat to the physical integrity of the tip and ring amplifiers. There is a common mode effect from amplifier 53 on tip and ring amplifiers 17 and 18; and there is a current profile effect from feedback functions circuit 16, via circuit 20, on those amplifiers. If the fault is one that pulls the tip connection 10 (which is normally near ground) in a negative direction, the combination of the common mode and current profile effects drives the tip amplifier 17 hard to make a correction, but the ring connection 11 is normally negative and the combined effects cause less severe drive in the ring amplifier 18. In that circumstance, the tip amplifier could be called upon, within its normal voltage operating range, to produce possibly damaging currents. If the fault were one that pulls tip and ring positively toward ground, the tip connection 10 is already close to ground and so the combined effects pose no threat to the tip amplifier 17. The combined effects tend to drive the normally-negative ring amplifier hard, but in this case the supply called for from a regulator function (not separately shown) in circuit 20 is so low that the ring amplifier cannot be driven hard enough to damage itself.

The collector of transistor 87 is advantageously connected to any convenient utilization circuit that is to be operated at the onset of positive threshold limiting. One such utilization circuit includes the electronic hybrid and feedback control circuit 20 in FIG. 1 for causing variations in the output on lead 28. A resistor 88 connects the collector to supply 69. In the absence of limiting at transistor 87, there is no current through resistor 88, so the control output voltage is equal to the negative supply 69. At the onset of limiting at transistor 87, its collector current is applied to resistor 88 to develop the positive-going control output voltage that is used as aforesaid to power down the interface unit.

Although the present invention has been described in connection with a particular embodiment thereof, it is to be understood that additional embodiments, modifications, and applications thereof which will be obvious to those skilled in the art are included within the spirit and scope of the invention.

What is claimed is:

1. A signal limiting amplifier having a ground referenced output and comprising
   a plurality of amplifier stages connected in tandem,
   means, connected to an interstage coupling connection between two of said stages, for sensing and limiting voltage signals at said connection with respect to ground to confine output signals from said limiting amplifier to a predetermined amplitude range,
   a differential input connection,
   a two-wire-circuit connection for receiving common mode signals and differential mode signals, and
   means connected to said two-wire-circuit connection for coupling said common mode signals to said differential input connection and rejecting said differential mode signals.

2. The amplifier in accordance with claim 1 in which said coupling means comprises
   first and second current summing input resistors, and
   means for connecting one end of each of said resistors to a common input of said amplifier whereby input signals applied to another end of each of said resistors, respectively, are averaged at said common input in accordance with the relative resistances of said resistors.

3. In a telephone line feed circuit including electronic line feed amplifiers and a common mode circuit amplifier for biasing said line feed amplifiers to operate in a predetermined operating range, said common mode amplifier comprising
   a plurality of amplifier stages connected in tandem,
   means, responsive to received line circuit signals, for driving said common mode circuit amplifier. and
   means, connected to an interstage coupling connection between two of said stages, for sensing and limiting voltage signals at said connection to confine output signals from said common mode circuit amplifier to a predetermined amplitude range.

4. The line feed circuit in accordance with claim 3, in which said limiting means comprises
   at least one semiconductor junction connected to apply, when forward biased, to said interstage connection a predetermined signal limiting reference voltage.

5. The line feed circuit in accordance with claim 4 in which
   said at least one junction is a base-emitter junction of a transistor which also has a collector terminal.

6. The line feed circuit in accordance with claim 5 in which
   means, responsive to current conduction at said collector terminal, are provided for powering down circuits, including said common mode amplifier, of said line feed circuit.

* * * * *